Jan. 5, 1926.    J. W. MEADOWCROFT    1,568,080
ELECTRIC WELDING
Filed May 18, 1922
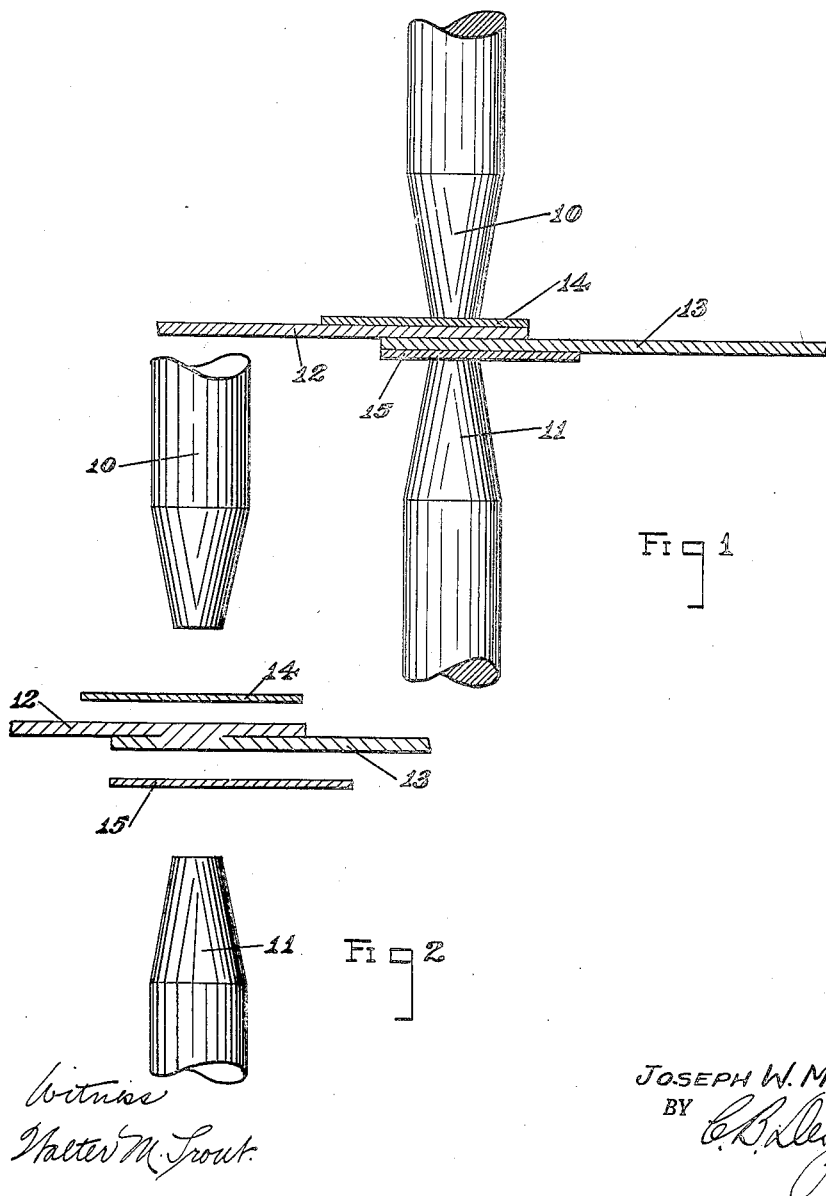
INVENTOR.
JOSEPH W. MEADOWCROFT.
BY
ATTORNEY Patented Jan. 5, 1926.

1,568,080

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRIC WELDING.

Application filed May 18, 1922. Serial No. 561,843.

*To all whom it may concern:*

Be it known that I, JOSEPH W. MEADOWCROFT, a citizen of the United States, residing at Philadelphia, Pennsylvania, have invented certain new and useful Improvements in Electric Welding, of which I declare the following to be a full, clear, and exact description.

My invention relates to improvements in electric welding and has to do, more particularly, with that type or form of electric resistance welding which is known as spot-welding.

Electric spot-welding has been extensively used for a number of years for uniting pieces of sheet steel by a series of isolated spot-welds formed in the pieces to be united by the passage of a welding current therethrough. This is customarily accomplished by applying, under pressure, copper electrodes, connected to opposite sides of a source of welding current, to opposite faces of the pieces of steel or metal to be united. The pieces to be united furnish a greater resistance to the passage of the welding current than the copper electrodes and such resistance generates a welding heat in the pieces to be joined at the spots where the electrodes are applied under pressure.

It has been attempted to unite pieces of aluminum or aluminum alloys, of which aluminum is the major constituent, by the method just described but, to the best of my knowledge and belief, all such attempts have proved commercial failures and it has been generally believed that it is impossible to spot-weld aluminum or aluminum alloys in such a manner as to produce a weld comparable from practical points of view with welds produced in sheet steel and iron. I have invented a method by which pieces of aluminum or aluminum alloy can be successfully spot-welded and by means of which sheet metal work may be constructed consisting of pieces of sheet metal, of which aluminum is the major constituent, united by a number of isolated spot-welds surrounded by unwelded areas.

The main object of my invention is to provide a practical method for electrically spot-welding pieces of metal, of which aluminum is the major constituent, such, for instance, as aluminum or alloys containing aluminum as the major constituent and known generally as aluminum alloys.

A further object of my invention is to provide a method of electric spot welding in which the superposed pieces of metal to be united are interposed between sheets of resistance material, in which heat spots are generated by the passage of the welding current upon the application of the welding electrodes thereto, the heat from said heat spots being conducted to the pieces to be united to raise the latter at the spots to be welded to a welding heat.

Yet another and one of the most important objects of my invention is to provide a method of electric spot welding of sheet materials of the class of aluminum sheet which may be used on the standard commercial welding machines available without change, and used by the application of the same electrodes, and welding currents and pressures of the same relative volume and amount, respectively, as commonly used in welding steel and iron sheets and within the range of the standard machines. The importance of being able to weld high conductivity as well as low conductivity materials on one and the same machine, and without intricate and troublesome adjustment, will be readily comprehended. It not only makes for standardized machines for all services, but for more efficient operation and the same high speed welding production that is at present obtainable in the fabrication of sheet steel products.

Further objects, and objects relating to details and economies of operation, will definitely appear from the detailed description to follow. In one instance, I accomplish the objects of my invention by the devices and means described in the following specification. My invention is clearly defined and pointed out in the appended claims. A preferred embodiment of my invention is illustrated in the accompanying drawing, forming a part of this specification, in which:

Fig. 1 is a sectional view through the pieces of metal to be united and the sheets of resistance material, illustrating the application of the electrodes thereto.

Fig. 2 is a similar view showing the finished weld and the sheets of resistance material and electrodes separated to release the welded pieces.

In the drawing, the same reference numerals refer to the same parts throughout the several views.

In general, I accomplish the objects of my invention by interposing the superposed pieces of metal to be united between sheets of resistance material and applying welding electrodes to opposite faces of said sheets, under pressure, thereby generating a welding heat at a spot or spots in the pieces to be united, due both to the heat created in the pieces to be united by resistance to the passage of the welding current and to the heat conducted from the sheets of resistance material to the pieces to be united. The resistance material should be of greater electrical resistance than either the pieces of metal to be united or the electrodes, with the result that the greatest heat is generated at spots in the sheets of resistance material at the points where the electrodes are applied. It is also desirable that the resistance material should have less heat conductivity than the pieces to be united, so as to tend to keep the heat generated in said resistance material localized at a spot or spots which are maintained by the electrodes in tight contact with the exposed faces of the pieces to be united. I have found that, when my invention is used for welding together pieces of sheet aluminum, or an aluminum alloy, the best results are obtained by interposing the pieces to be united between sheets of steel and applying copper electrodes connected to the source of welding current to opposite faces of said steel sheets.

In the accompanying drawing, I have illustrated, more or less diagrammatically, my improved method of electric welding. Referring to the numbered parts of the drawing, the pieces of sheet metal, 12 and 13, to be united, are lapped or superposed one upon the other. In the present case, these pieces of metal are an aluminum alloy, containing a very large percentage of aluminum, and known to the trade as "duralumin." This same method may also be used for uniting pieces of sheet aluminum, or other alloys of which aluminum is the major constituent. The superposed pieces, 12 and 13, to be united, are interposed between plates or sheets of resistance material, 14 and 15. In welding sheet aluminum or aluminum alloys, according to this method, I find that the best results are obtained by using steel as the resistance material and by interposing the superposed pieces of aluminum, or aluminum alloy, between sheets of steel. I have also found that, to obtain the best results the thickness of the sheets of steel should vary with the thickness of the sheets or pieces of aluminum or aluminum alloy which are to be welded together. For example, in welding two pieces of "duralumin", each having a thickness of .050 inches, sheets of steel should be used having a thickness of .018 to .020 inches. After the superposed pieces of metal, 12 and 13, have been interposed between the sheets of resistance material, 14 and 15, the welding electrodes, 10 and 11, are brought into contact with opposite faces of the sheets, 14 and 15, and pressure is applied to these electrodes. The electrodes, 10 and 11, are connected to opposite sides of any suitable source of welding current and current passes from the electrode, 10, for instance, through sheet, 14, the superposed pieces, 12 and 13, and sheet, 15, to the opposite electrode, 11. The passage of the welding current through the pieces of resistance material, 14 and 15, generates hot spots in said sheets at the points where the electrodes contact with them and such hot spots are maintained in contact with the exposed faces of the pieces, 12 and 13, to be united, by the pressure of the electrodes. Some heat is also generated in the pieces to be united, due to the passage of the welding current therethrough. When the electrodes are thus brought into contact with the sheets, 14 and 15, and pressure and welding current applied thereto, it will be found, after the electrodes are separated and the sheets, 14 and 15, removed, that the pieces, 12 and 13, have been united by an isolated spot-weld at a spot of integral and autogenous welded union and that the metal at such spot of welded union has substantially the same qualities as at other points.

The pieces of metal, 12 and 13, consisting of aluminum, or an aluminum alloy, are united as stated, by a spot of autogenous welded union but the steel sheets, 14 and 15, do not weld to the sheets of aluminum, or aluminum alloy, and may be removed therefrom very easily after the weld has been completed. The electrodes, 10 and 11, are preferably of copper and it will be observed that the sheets of steel, 14 and 15, have greater electrical resistance and less heat conductivity than either the pieces, 12 and 13, to be united, or the electrodes, 10 and 11. This results in the creation of localized heat spots in the sheets of steel, the heat being generated therein due to the greater electrical resistance of the steel and being largely maintained at the spots where generated, or conducted to the adjacent spots in the pieces, 12 and 13, due to the fact that the aluminum, or aluminum alloy, is a better conductor of heat than the steel.

As stated, the steel sheets do not weld to the sheets of aluminum. They actually remain in solid form. If they became plastic in considerable degree, or were fused, they would become welded to the aluminum. Remaining solid and separable as they do, by their greater rigidity they not only clamp the aluminum sheets the more closely together about the region of the weld and thus prevent any tendency to exude of melted aluminum in the weld (which exuding would tend to separate the sheets at the weld), but they also present a smooth face of contact with the exterior surface of the aluminum, thus preventing the electrodes from malforming that surface and insuring its plane character irrespective of the pressure and of softening or fusing of the exterior surfaces of the aluminum.

By means of the method which I have just described, I have succeeded in electrically spot-welding together pieces of sheet aluminum and aluminum alloy. This is a result which, I believe, has never been attained before and I have produced a new article of manufacture, that is, composite metal work consisting of pieces of sheet aluminum or of aluminum alloy sheets united by one or more spot-welds. I, therefore, claim broadly the process of spot-welding pieces of aluminum or aluminum alloy and the product resulting therefrom. I believe that my method of spot-welding, in which I apply sheets or plates of resistance material to the pieces to be united and generate a hot spot or spots in such sheets by the passage of a welding current to provide the welding heat for the pieces to be united is broadly new and I, therefore, claim such method broadly, without limiting myself to its use in connection with the welding of aluminum or aluminum alloys.

I am aware that the particular embodiment of my invention, which I have disclosed in this application, may be varied considerably, without departing from the spirit of my invention and, therefore, I claim my invention broadly, as indicated by the appended claims.

Having thus described my invention, what I claim as new and useful and desire to secure by Letters Patent is:

1. The method of uniting pieces of metal of which aluminum is the major constituent consisting in welding said pieces together at spots by the application of heat, electrically generated in greater part and localized at a spot or spots in a sheet or plate of resistance material external to the pieces to be united, and the application of pressure localized at the spot or spots at which the pieces are to be welded, whereby the mass of aluminum juxtaposed to said spot or spots is heated to welding temperature by conduction of the heat generated therein.

2. The method of uniting pieces of metal of which aluminum is the major constituent consisting in interposing the superposed pieces of metal to be united between plates or sheets of resistance material of sufficiently greater electrical resistance than the pieces to be united to develop the greater part of the welding heat in the body thereof, and applying, under pressure, electrodes connected to opposite sides of a source of welding current to opposite faces of said plates or sheets, whereby the pieces of aluminum derive their welding temperatures largely by conduction from said resistance material.

3. The method of spot welding together sheets of material of relatively low specific resistance which consists in intervening between the electrodes and the exterior sheet surfaces sheet material of comparatively high specific resistance and of a thickness varying with the thickness of the sheets to be welded, and generating the major portion of the welding heat in said intervened material.

4. The method of spot welding together sheets of material of relatively low specific resistance which consists in intervening between the electrodes and the exterior surfaces of the sheets to be welded, sheet material of comparatively high specific electrical resistance and of a thickness in the neighborhood of four tenths of the thickness of the sheets to be welded, and generating the greater portion of the welding heat in said material.

5. The method of spot welding sheets of material of relatively low specific resistance and fusing point which consists in intervening between the electrodes and the exterior surfaces of the sheets to be welded a material having a comparatively high specific electrical resistance and fusing point, and of an aggregate resistance varying in accordance with the thickness of the sheets of material to be welded.

6. The method of spot welding sheets of material of relatively low specific resistance which consists in intervening between the electrodes and the exterior surfaces of the sheets to be welded steel sheets of a thickness approximately four tenths of the thickness of the sheets to be welded.

7. The method of spot welding sheets of material of relatively low specific resistance which consists in intervening between the electrodes and the exterior surfaces to be welded sheet material of comparatively high specific electrical resistance, and of greater surface extent than the contact surface of said electrodes, applying pressure to the overlying sheets through the electrodes, and generating the greater part of the welding heat in the intervened sheet material without bringing the same to the temperature at which it will adhere to the sheets being welded.

8. The method of spot welding sheets of material of relatively low specific resistance which consists in intervening between the exterior surfaces to be welded sheet material of comparatively high specific resistance and of a guage adjusted to develop when traversed by welding current approximately that heat needed to supply by conduction to the material to be welded substantially the precise amount of heat required for a proper weld.

In testimony whereof, I affix my signature.

JOSEPH W. MEADOWCROFT.